United States Patent [19]

Tanaka

[11] Patent Number: 4,613,389

[45] Date of Patent: Sep. 23, 1986

[54] PROCESS FOR THE MANUFACTURE OF FLEXIBLE TUBES

[75] Inventor: Kenichi Tanaka, Tokyo, Japan

[73] Assignee: Kakuichi Technical Development Service Kabushiki Kaisha, Tokyo, Japan

[21] Appl. No.: 734,892

[22] Filed: May 16, 1985

[30] Foreign Application Priority Data

Apr. 2, 1985 [JP] Japan .................................. 60-68418

[51] Int. Cl.⁴ ........................... F16L 11/08; B31C 1/00
[52] U.S. Cl. ..................................... 156/143; 138/122; 138/129; 156/195; 156/244.13; 156/244.15
[58] Field of Search ................... 156/143, 195, 244.13, 156/244.15; 138/122, 129

[56] References Cited

U.S. PATENT DOCUMENTS 3,199,541  8/1965  Richitelli ............................ 138/129
3,885,594  5/1975  Tanaka ................................ 138/129
4,302,261  11/1981 Simkins et al. ................. 156/143 X
4,343,672  8/1982  Kanao .............................. 156/143 X
4,350,547  9/1982  Kanao ................................ 156/143
4,383,555  5/1983  Finley .............................. 156/143 X Primary Examiner—David Simmons
Attorney, Agent, or Firm—Koda and Androlia

[57] ABSTRACT

A process for the manufacture of flexible tubes including a main body of a rubber material and a reinforcing element of a hard resin material in which the reinforcing element is embedded at least partly in the main body in a form of helical coil and adjoined thereto to form an integral body of the flexible tube. The flexible tube is manufactured by helically winding a composite web of a rubber strip and a hard resin strip adjoined to each lateral side end of the rubber strip with the web being in a plastic condition so that a lateral end portion of the resin strip in the web of each turn is made to be in contact with and adjoined to that of the preceding turn.

7 Claims, 9 Drawing Figures

PROCESS FOR THE MANUFACTURE OF FLEXIBLE TUBES

BACKGROUND OF THE INVENTION

1. Field of the Invention

The present invention relates to a process for the manufacture of flexible tubes and more particularly, to that of rubber flexible tubes reinforced with a helical coil of hard or rigid resin material, for instance a hard synthetic resin material. Such reinforced flexible tubes have relatively high pressure resistance, abrasion resistance, chemical resistance, bending strength, tensile strength and the like and thus have been widely employed in various fields to feed air or the like gases, oil or the like liquid, or powder, granule or the like flowable solid substance.

2. Prior Art

Various processes have been proposed for manufacturing flexible tube reinforced with a hard helical coil of, for instance, a hard synthetic resin material (for instance, see U.S. Pat. No. 4,350,547 as well as Jap. Unexamined Pat. Appln. Gazette Nos. 118460/1978, 59746/1982, 38045/1984 and 42943/1984).

In conventional reinforced flexible tubes, there are two types; one wherein a reinforcing helical resin element is fully embedded in or covered with a rubber matrix as a main body or wall of the flexible tube and one wherein a part of the resin element is exposed out of the rubber matrix. At any rate, such conventional flexible tubes have been manufactured by separately extruding a resin strip and an unvulcanized rubber strip, adjoining the resin strip to the rubber strip to form a composite strip or web, feeding the web to a tube former and helically winding thereon, so that a lateral end portion of the web in each turn overlaps on that in the preceding turn to form a tubular body. Then the rubber portion in the tubular body is vulcanized.

According to conventional common techniques, a lateral side end of the rubber strip in the composite web is helically wound and converted into the tubular body. In this case, the overlapped portion is pressed at its boundary area and a final bonding is attained through the subsequent vulcanizing treatment.

In other words, the flexible tube based on such common techniques has been manufactured by utilizing a so-called "rubber to rubber" bond of the composite web. Therefore, it is impossible rather than difficult to attain the desired bonding power or strength at the boundary layer and consequently, there is a tendency that strength of the flexible tube per se tends to be reduced, namely in bending strength, tensile strength, pressure resistance and others.

The following may be considered as grounds for causing said disadvantages in the conventional flexible tube of this kind.

(a) Scorching of the rubber element:

The composite web has been formed by extruding the rubber strip and resin strip and making contact of these strips, while in a plastic condition. In this case, when a hard resin material, for instance, a hard polyvinyl chloride is selected for the resin strip, a relatively high temperature of about 170° to 180° C. is required for its extrusion, and the rubber strip contacting to such a high temperature resin strip tends to cause deterioration due to scorching thereof, which will inhibit a development of sufficient bonding power when mutual bonding of rubber portions in the composite web is conducted at a subsequent step.

(b) Shrinkage of rubber element:

The rubber material extruded from a die in the extruder therefor tends to shrink due to its cooling by air. Therefore the resulting rubber strip has an irregular surface which becomes one of causes for reducing the bonding power.

(c) Effect of volatile substances in rubber composition:

The vulcanization for manufacturing the flexible tube of this kind has been carried out under atmospheric pressure. Therefore volatile substances in the rubber strip of the composite web are vaporized and the vaporized substances tend to concentrate at an interface of the rubber surfaces to be bonded to cause a swelling therein or peeling off in the bonded area.

Further, the conventional manufacturing process has a disadvantage in that the tubular body just after its formation by the helical winding of the composite web has a quite low self-supporting ability since the rubber portion has not yet been vulcanized. This requires a careful handling in its transfer during the manufacturing step until its vulcanization has completely been finished, a reduction in feeding speed or the making of the vulcanizing chamber longer and thus those requirements productivity problems and installation space problems for the manufacturing apparatus.

SUMMARY OF THE INVENTION

A principal object of the invention is to provide a process for the manufacture of flexible tubes which does not show any disadvantage referred to above in connection with the conventional flexible tubes.

A specific object of the invention is to provide a process for the manufacture of flexible tubes which have excellent physical characteristics.

A further specific object of the invention is to provide a process for the manufacture of flexible tubes which shows a good self-supporting ability even when the tubular body has just been formed so that a feeding speed of a composite web for converting the web into the tubular body can be made higher than that in any conventional process and so that the structure of a tube former and transferring device for the tubular body can be simplified.

According to the invention, such objects and other objects can be attained by a process for the manufacture of flexible tubes, which includes steps of transferring and forming an unvulcanized kneaded rubber composition into a rubber strip, while raising up a temperature of the rubber composition to a vulcanization temperature range thereof, extruding two hard resin strips, each having a complementary cross section, adjoining said resin strips to each edge of said rubber strip to form a three-layered composite web, feeding said web to and helically winding same on a tube former to cause a mutual contact and bond at a lateral end portion in the resin strip of each turn to that of a preceding turn, supporting the resulting tubular body on rotary transferring rollers to pass a heating chamber to make the vulcanization of the semi-vulcanized rubber part in the tubular body complete.

Namely, according to the invention, the disadvantages of conventional flexible tubes on physical characteristics can be obviated and overcome by changing the "rubber to rubber" bonding to a "resin to resin" bonding, and the disadvantage in self-supporting ability of the tubular body as an intermediate product can be eliminated by feeding the rubber element, while proceeding with its vulcanization.

For carrying out the process of the invention, it is convenient that kneaded rubber composition is fed to a shear-head to raise its temperature to the vulcanization temperature range by generation of heat due to a shearing of the rubber composition per se and simultaneously therewith, the rubber composition is extruded into the rubber strip by the shear-head. It is preferable to prevent a cooling of the composite web and the tubular body by thermally insulating or heating an area from a composite web forming portion to an entrance of the heating chamber.

The rubber composition to be employed for the invention should be selected by taking the specific use of the flexible tube to be manufactured into consideration but it may be of a composition including as a main component, EPDM, NBR, SBR, NR or the like, or any combination thereof and as a sub-component, suitable additives or aids such as a vulcanizing agent, accellator, anti-oxidant, stabilizer, filler and the like. A main ingredient of the resin material for the resin strip may be selected from hard synthetic resin materials such as polyethylene, polypropylene, polyvinyl chloride, polystyrene, polyacrylonitrile, polyamide, or any mixture or copolymer thereof. Please note, however that a combination of the rubber and resin materials should, of course, be decided by carefully studying the co-solubility and other various factors in both materials. For instance, it is quite suitable to select the EPDM composition as the rubber material, if polyethylene is selected as the resin material.

PREFERRED EMBODIMENTS OF THE INVENTION

Figure 1:
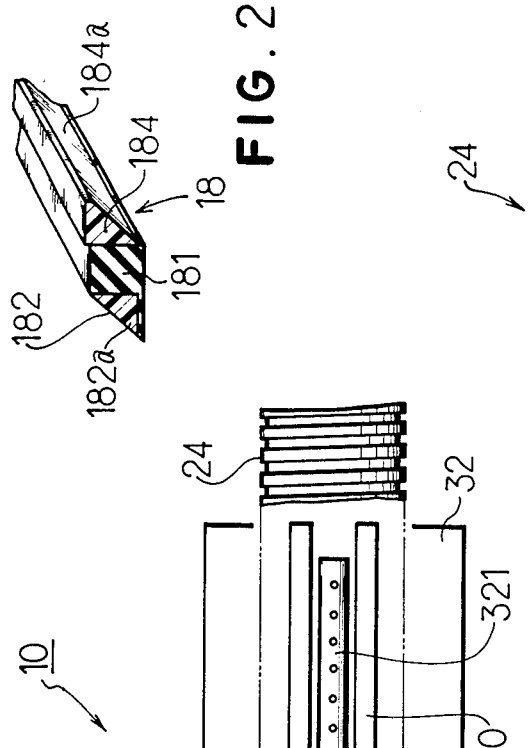
FIG. 1 is a schematic plan view showing an apparatus which is suitable for carrying out a process according to the present invention.

In FIG. 1, an apparatus suitable for carrying out the process of the invention is schematically illustrated and designated with a reference numeral 10. The apparatus 10 comprises an extruder 12 for kneading an unvulcanized rubber composition and extruding same in a plastic state, a first heating device 14 for further raising the temperature of the unvulcanized rubber composition extruded from the extruder 12 and extruding same into a continuous rubber strip in a plastic state, another extruder 16 for kneading a resin composition and extruding same into two separate continuous strips in a plastic state, a cross-head 20 with a die 20a for making the rubber strip and the resin strips integral to form a three-layered composite web 18 in a plastic state, and a tube former 22 for herically winding thereon the composite web 18 in a closed manner and causing a bonding thereof at a mutual contacting area of the composite web 18 to form a tubular body. As the first heating device 14, a commercially available shear-head may be selected. If a shear-head is employed for this purpose, the generation of heat due to a shearing of the rubber composition per se can freely be controlled by adjusting a rotational speed of a mandrel (not shown) arranged in a cylinder as a housing. According to the invention, a temperature of the rubber composition is raised up to about 140° to 180° C. by the shear-head and thus the unvulcanized rubber composition will be extruded and made into the rubber strip, while starting and proceeding with its vulcanization. Said resin extruder 16 extrudes the two resin strips at an extruding temperature of about 160° to 190° C., although the temperature depends on a kind of selected resin material. For rubber and resin strips, it is preferable to maintain the cross-head 20 at a temperature of about 190° C. As aforesaid, the cross-head 20 bonds the extruded rubber strip by said heating device (shear-head) 14 to the extruded resin strips to extrude the composite web 18 from its die 20a. The composite web 18 has a configuration as, for instance, shown in FIG. 2. Namely, resin strips 182, 184 are bonded to left and right sides of single rubber strip 181 to form the three-layered composite web 18. In this case, the resin strips 182 and 184 have a complementary configuration to each other. In the embodiment shown in FIG. 2, the resin strips 182, 184 are in a square pillar configuration, if it is assumed that a slanting surface 182a in the resin strip 182 shall contact with a slanting surface 184a in the resin strip 184.

The composite web (three-layered web) 18 is fed to the tube former 22 and helically wound thereon, during which the web is kept in a hot or plastic condition. For preventing a cooling thereof, a heat insulator (not shown) may be provided for passage of the composite web 18 and the tubular body formed on the tube former 22 or as a positive measure, heating means such as a hot air heater, infrared heater or the like (not shown) may be provided independently from or together with the heat insulator. As the tube former 22, a conventional one as disclosed in U.S. Pat. No. 3,997,382 (Jap. Examined Pat. Appln. Gazette No. 5543/1977, Jap. Pat. No. 880014) may be employed, which comprises four rotary shafts supported in a cantilever-like manner and arranged so as to form a cylindrical surface, and a press and feeding roller provided near one of the rotary shafts. In case such a tube former is employed for the invention, the roller 223 will press the helically fed composite web 18 to make contact and bond the slanting surface 182a in the resin strip 182 of the composite web 18 to the slanting surface 184a in the other resin strip 184 to convert the composite web 18 into the tubular body 24 (see also FIG. 2). Each of said rotary shafts 221 has a roller (not shown) with a split sleeve (not shown), which rollers are rotated in the same direction at a constant rotational speed; but said split sleeve is driven in a forward direction when it contacts with an inner surface of the tubular body and is driven in rearward direction when it does not contact with the inner surface of the tubular body, whereby the tubular body to be formed on the tube former is rotatingly transferred.

Figure 3:
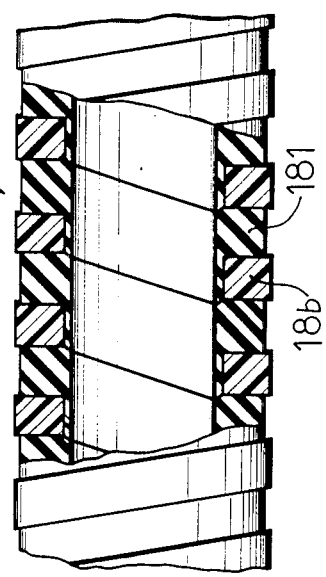
FIG. 3 is a partial side view of a flexible tube manufactured by the process according to the invention, a part thereof being cut-off to show the structure of the wall of the flexible tube.
Figure 4A:
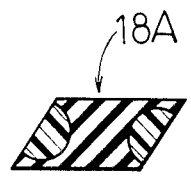
FIGS. 4A, 4B, 4C and 4D are cross sections of the three-layered composite webs, respectively, which are different from that of FIG. 2 in configuration.
Figure 4B:
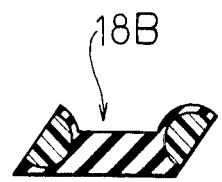
Figure 4C:
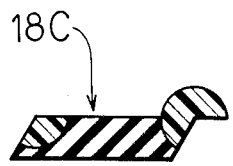
Figure 4D:
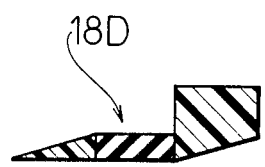

Since the rubber strip portion 181 in the composite web 18 has been raised to a temperature through the first heating device 14 and the cross-head 20, as referred to before and fed to the tube former 22, while proceeding with its vulcanization, the rubber portion as it reaches the tube former is in a semi-vulcanized state to show a remarkable self-supporting ability. On the other hand, the resin strips 182, 184 in the composite web 18 are in a plastic state, as also aforesaid and thus when the composite web 18 is helically wound on the tuber former 22 and pressed between one of the rotary shafts 221 and the press roller 223, the contacting area of the resin strips are easily bonded to form the tubular body 24 as shown in FIG. 3, together with the rubber portion formed by the rubber strip 181. An integral body formed by the bonded resin strips 182, 184 forms a reinforcing element 186 in the form of a continuous helical coil.

The tubular body 24 beyond the tube former 22 is then fed to a second heating chamber 26 to complete the vulcanization in its rubber portion. For this purpose, a heating device 261 is provided in the second heating heating chamber 26. It is preferable to keep a space in the second heating chamber at a temperature of about 140° to 180° C. In the illustrated embodiment, a plurality of infrared heaters are arranged as the heating device 261, but those may be changed to a hot air heater. Before reaching the second heating chamber 26, the rubber portion in the tubular body 24 has been raised up to its vulcanization temperature range and thus it unnecessary to specially and separately heat an inner portion of the tubular body, and the tubular body 24 already has a relatively highself supporting ability and thus supporting rollers 28 with a simple structure can be employed for transferring said tubular body 24 through the second heating chamber 26.

The tubular body 24 passing through the second heating chamber 26 is supported by other rollers 30 and fed to a cooling chamber 32 to cool same with cooling water sprayed out from a supplier 321. The resulting cooled tubular body is cut in a desired length to make a flexible tube product.

Figure 2:
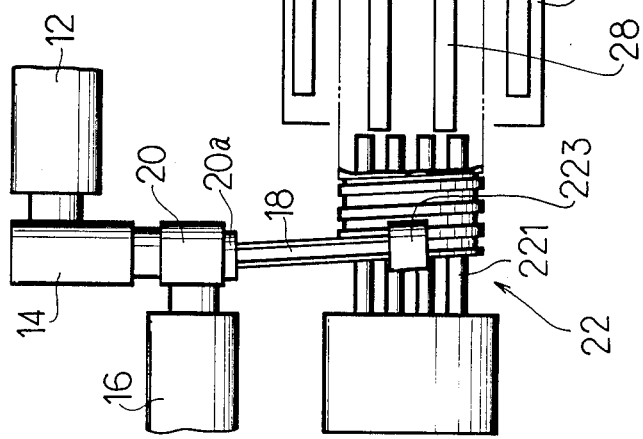
FIG. 2 is a perspective view showing one of the configurations of the three-layered composite web formed by way of the process according to the invention.

A configuration of the composite web (three-layered composite web) 18 as employed for the process of the invention is not limited to that as shown in FIG. 2. For instance, composite webs 18A, 18B, 18C and 18D as illustrated in FIGS. 4A-4D may be formed and employed for the invention.

TEST EXAMPLE 1

Two kinds of rubber compositions, namely including EPDM or SBR/NBR as the main component as well as two kinds of resin materials, namely including polyethylene or polyvinyl chloride as main component were selected to prepare following test composite webs and control composite webs, each of which was converted into a respective flexible tube, according to a manner disclosed before to study the vulcanization characteristics in rubber the portion thereof and feeding speed (forming speed of the flexible tube).

Test composite webs:
corresponding to the composite web 18 shown in FIG. 2.

Figure 5:
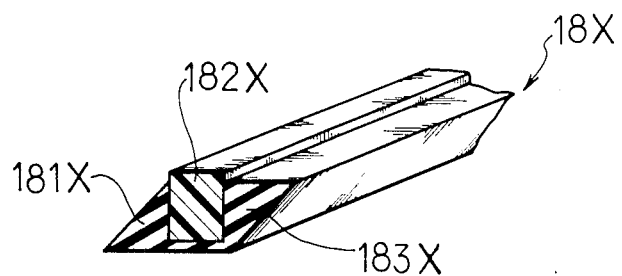
FIG. 5 is a perspective view showing one of composite webs which have been formed by way of a conventional process for manufacturing a flexible tube similar to that of the product of the present invention, as shown in FIG. 2.

Control composite webs:
corresponding to a composite web 18X shown in FIG. 5, wherein 181X, 183X—unvulcanized rubber strip portion, and 182X—resin strip portion.

In each of the test composite web, vulcanizing values in the rubber portion thereof have reached 10% and 50%, respectively, by raising the temperature of the raw material rubber composition to about 140° C. and 160° C., respectively by the first heating device (shearhead) 14. On the other hand, the control composite web was fed in an unvulcanized state (vulcanizing value: 0%) to the tube former 22 for helical winding thereon to form a tubular body and then fed to the heating chamber 26 for initializing and finishing vulcanization in its rubber portion.

In each case, the vulcanization characteristics and required feeding speed were measured to obtain results shown in a following Table. As apparently seen from the Table, the feeding speed can remarkably be increased, namely 1.2-5.2 times (vulcanizing value: 10%) or 2.6-10.5 times (vulcanizing value: 50%) to improve a productivity of the flexible tube.

| rubber | Vulcanization Characteristics (min.) | | | Feeding Speed (m/min.) | | |
|---|---|---|---|---|---|---|
| | $T_{10}$ | $T_{90}$ | $T_{50}$ | Control | Invention $T_{10}$ | $T_{50}$ |
| EPDM | | | | | | |
| 1 | 2.8 | 10.7 | 6.75 | 0.14 | 0.19 | 0.38 |
| 2 | 2.9 | 10.7 | 6.80 | 0.14 | 0.19 | 0.38 |
| 3 | 2.5 | 10.2 | 6.35 | 0.15 | 0.19 | 0.39 |
| 4 | 2.4 | 9.4 | 5.90 | 0.16 | 0.21 | 0.43 |
| 5 | 2.8 | 9.7 | 6.25 | 0.15 | 0.22 | 0.43 |
| 6 | 3.0 | 10.0 | 6.50 | 0.15 | 0.21 | 0.43 |
| 7 | 2.7 | 9.0 | 5.85 | 0.17 | 0.24 | 0.48 |
| 8 | 2.8 | 10.2 | 6.50 | 0.15 | 0.20 | 0.41 |
| SBR/NBR | | | | | | |
| A | 2.8 | 4.9 | 3.85 | 0.31 | 0.71 | 1.43 |
| B | 4.6 | 5.7 | 5.15 | 0.26 | 1.36 | 2.73 |

TEST EXAMPLE 2

Temperature changes in rubber portion have been measured, with reference to productions of flexible tubes according to the present invention process and a control one (conventional process). In this case, a stroke of the tube former 22 and a longitudinal size of the second heating chamber 26 were made as 20 and 150 cm, respectively.

Figure 6:
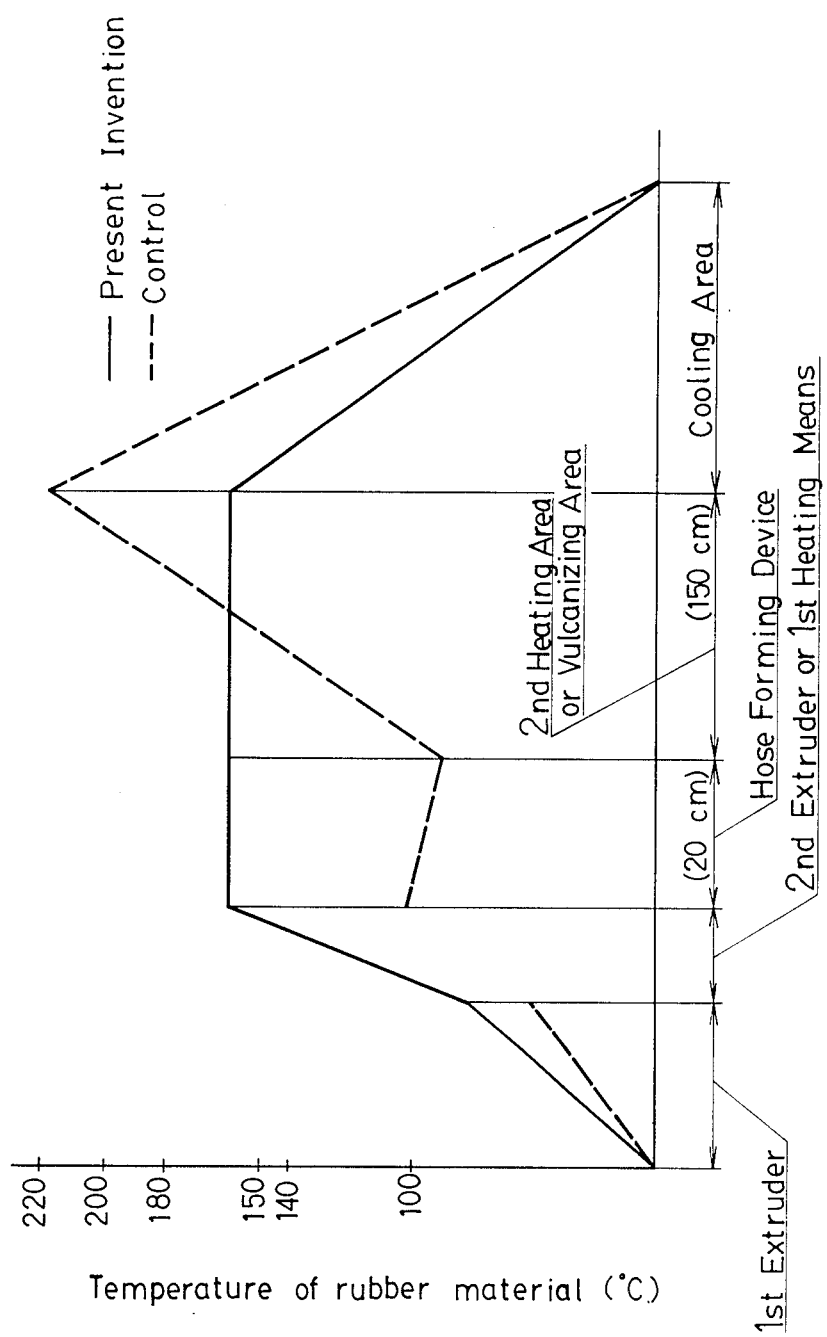
FIG. 6 is a graph showing temperature changes in rubber materials, when flexible tubes are manufactured according to the present invention process and a conventional process.

Results are shown in a graph of FIG. 6, and it has been found that according to the control process, a temperature in the heating chamber (vulcanizing chamber) 26 should eventually be made at about 220° C. and consequently it tends to cause undesirable influences such as swelling at boundary area of the rubber-rubber bonding portion of the resulting flexible tube.

What is claimed is:

1. A process for the manufacture of flexible tubes, which comprises steps of transferring and forming an unvulcanized kneaded rubber composition into a rubber strip, while raising-up a temperature of the rubber composition to a vulcanizing temperature range thereof, extruding two hard resin strips, each having a complementary configuration, adjoining said resin strips to each lateral side of said rubber strip to form a three-layered composite web, feeding said composite web to a tube former and helically winding same thereon to cause mutual contact and bond at a lateral end portion in the resin strips of each turn to that of a preceding turn, supporting the resulting tubular body on rotary transferring rollers to pass the tubular body through a heating chamber to make a vulcanization of semi-vulcanized rubber part in said tubular body complete.

2. A process as claimed in claim 1, wherein the kneaded rubber composition is fed to a shear-head to raise its temperature to the vulcanization temperature range by generation of heat due to a shearing of the rubber composition per se and simultaneously therewith, said rubber composition is extruded into said rubber strip by said shear-head.

3. A process as claimed in claim 1 or 2, wherein an area from a composite web forming portion to an entrance of said heating chamber is thermally insulated to form a closed passage for said web and tubular body.

4. A process as claimed in claim 1 or 2, wherein an area from a composite web forming portion to an entrance of said heating chamber is heated to accelerate a pre-vulcanization of the rubber part in said web and tubular body.

5. A process as claimed in claim 1 or 2, wherein said resin material is polyethylene and said rubber material is an EPDM composition.

6. A process as claimed in claim 3, wherein said resin material is polyethylene and said rubber material is an EPDM composition.

7. A process as claimed in claim 4, wherein said resin material is polyethylene and said rubber material is an EPDM composition.

* * * * *